(12) United States Patent
Esau et al.

(10) Patent No.: US 10,793,099 B2
(45) Date of Patent: Oct. 6, 2020

(54) GAS GENERATOR, IN PARTICULAR FOR A VEHICLE OCCUPANT PROTECTION SYSTEM, SPRING FOR ARRANGING IN A GAS GENERATOR, AIRBAG MODULE, AND VEHICLE OCCUPANT PROTECTION SYSTEM

(71) Applicant: TRW Airbag Systems GmbH, Aschau A. Inn (DE)

(72) Inventors: Anja Esau, Mühldorf am Inn (DE); Anton Greissl, Gars (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 44 days.

(21) Appl. No.: 15/760,243

(22) PCT Filed: Sep. 29, 2016

(86) PCT No.: PCT/EP2016/073268
§ 371 (c)(1),
(2) Date: Mar. 15, 2018

(87) PCT Pub. No.: WO2017/055459
PCT Pub. Date: Apr. 6, 2017

(65) Prior Publication Data
US 2019/0047508 A1 Feb. 14, 2019

(30) Foreign Application Priority Data
Oct. 2, 2015 (DE) .......................... 10 2015 012 703

(51) Int. Cl.
*B60R 21/16* (2006.01)
*B60R 21/264* (2006.01)
(Continued)

(52) U.S. Cl.
CPC ...... *B60R 21/2644* (2013.01); *B60R 21/2646* (2013.01); *F42B 3/04* (2013.01);
(Continued)

(58) Field of Classification Search
CPC ............ B60R 21/2644; B60R 21/2646; B60R 2021/26041; B60R 2021/26064; F42B 3/04
(Continued)

(56) References Cited

U.S. PATENT DOCUMENTS 2,250,042 A * 7/1941 Sundt .................... H01R 13/562
267/166.1
4,249,673 A * 2/1981 Katoh ................. B60R 21/2644
102/530
(Continued)

FOREIGN PATENT DOCUMENTS

DE     29818778      4/1999
DE     102013110810  4/2015

*Primary Examiner* — Toan C To
(74) *Attorney, Agent, or Firm* — Tarolli, Sundheim, Covell & Tummino LLP

(57) ABSTRACT

The invention relates to a gas generator (10), in particular for a vehicle occupant protection system, comprising at least an igniter (15) and a combustion chamber (17) containing a pyrotechnic solid fuel bed (18), wherein a spring (30) is arranged in the combustion chamber (17), which spring can be elongated in the direction of an end (22) of the combustion chamber (17) remote from the igniter (16) by a gas flow produced when the gas generator (10) is activated. According to the invention, the spring (30) has a plurality of spring segments (31, 32, 33) having outside diameters (Q1, Q2, Q3) of different size.

18 Claims, 2 Drawing Sheets

(51) Int. Cl.
*F42B 3/04* (2006.01)
*B60R 21/26* (2011.01)

(52) U.S. Cl.
CPC ............... *B60R 2021/26041* (2013.01); *B60R 2021/26064* (2013.01)

(58) Field of Classification Search
USPC .................. 280/736, 741, 742; 102/530, 531
See application file for complete search history.

(56) References Cited

U.S. PATENT DOCUMENTS

| | | | | | |
|---|---|---|---|---|---|
| 5,180,149 | A | * | 1/1993 | Given | F16D 65/22 267/176 |
| 5,390,954 | A | * | 2/1995 | Faigle | B60R 21/2171 280/736 |
| 5,588,817 | A | * | 12/1996 | Zirps | B60T 8/4031 137/541 |
| 5,636,865 | A | * | 6/1997 | Riley | B60R 21/2644 280/728.2 |
| 5,645,298 | A | | 7/1997 | Stevens et al. | |
| 7,055,812 | B2 | * | 6/2006 | Balsells | F16F 1/045 267/166 |
| 7,363,863 | B2 | * | 4/2008 | Engler | B60R 21/2644 102/530 |
| 8,034,075 | B2 | * | 10/2011 | Dehnad | A61B 17/3207 606/200 |
| 8,302,438 | B2 | * | 11/2012 | Lui | E05B 47/0012 70/277 |
| 9,205,802 | B1 | * | 12/2015 | Lang | B60R 21/268 |
| 9,293,849 | B2 | * | 3/2016 | Balsells | H01R 13/03 |
| 2003/0025313 | A1 | * | 2/2003 | Sawa | B60R 21/2644 280/741 |
| 2007/0075536 | A1 | * | 4/2007 | Kelley | B60R 21/272 280/737 |
| 2008/0023947 | A1 | * | 1/2008 | Gibbons | B60R 21/268 280/736 |
| 2009/0039628 | A1 | | 2/2009 | Zengerle et al. | |
| 2014/0367123 | A1 | * | 12/2014 | Hallundbæk | E21B 43/105 166/387 |

* cited by examiner

GAS GENERATOR, IN PARTICULAR FOR A VEHICLE OCCUPANT PROTECTION SYSTEM, SPRING FOR ARRANGING IN A GAS GENERATOR, AIRBAG MODULE, AND VEHICLE OCCUPANT PROTECTION SYSTEM

RELATED APPLICATIONS

This application corresponds to PCT/EP2016/073268, filed Sep. 29, 2016, which claims the benefit of German Application No. 10 2015 012 703.9, filed Oct. 2, 2015.

BACKGROUND OF THE INVENTION

The invention relates to a gas generator, in particular for a vehicle occupant protection system, comprising at least an igniter and a combustion chamber containing a pyrotechnic solid fuel bed, wherein a spring is arranged in the combustion chamber, which spring can be elongated in the direction of an end of the combustion chamber remote from the igniter by a gas flow produced when the gas generator is activated. In addition, the invention relates to a spring for arranging in a gas generator. Moreover, the invention relates to an airbag module as well as a vehicle occupant protection system.

Gas generators supply for example gas for filling an airbag or for driving a belt tensioner. In both cases it is important that the gas generated is rapidly made available. An exemplary gas generator is described in DE 10 2007 037 325 A1. Said gas generator comprises an igniter and a combustion chamber containing a solid fuel bed. Inside the combustion chamber a movable wall portion is arranged, wherein upon activation of the gas generator said wall portion is displaced within the solid fuel bed and prevents insufficient gas discharge. Due to the movable wall portion a gas containing passage is provided. The gas flowing out of the igniter thus passes through the gas containing passage to the solid fuel bed.

SUMMARY OF THE INVENTION

It is the object of the present invention to develop a gas generator, in particular the movable wall portion, especially preferred a spring, in such way that, on the one hand, an igniter cap can quickly break and, on the other hand, the igniting gas can be conveyed to the fuel bed as quickly as possible. Moreover, it is the object of the invention to state a spring for arranging in a gas generator, an airbag module as well as a vehicle occupant protection system.

In accordance with the invention, this object is achieved with respect to the gas generators, especially for a vehicle occupant protection system, by the subject matter of claims 13 and 31, with respect to the spring by the subject matter of claim 23, with respect to the airbag modules by the subject matter of claims 25 and 26, and with respect to the vehicle occupant protection systems by the subject matter of claims 27-30.

Advantageous and useful configurations of the gas generator according to the invention and, resp., of the spring according to the invention are described in the subclaims.

The invention is thus based on the idea to state a gas generator, especially for a vehicle occupant protection system, wherein the gas generator comprises at least an igniter and a combustion chamber containing a pyrotechnic solid fuel bed. In the combustion chamber a spring is arranged which can be elongated in the direction of an and of the combustion chamber remote from the igniter by the gas flow produced when the gas generator is activated.

In accordance with the invention, the spring includes a plurality of spring segments having outside diameters of different size, wherein each spring segment has a plurality of spring turns.

Accordingly, the spring comprises a plurality of spring segments, wherein a spring segment is characterized in that it comprises at least two spring turns. Such spring segment having plural spring turns has a continuously constant outside diameter. In a preferred embodiment of the invention, the spring comprises three, further preferred four, spring segments having outside diameters of different size, each spring segment including a plurality of spring turns, wherein also the respective inside diameters of the at least three or four spring segments preferably are of different size. Preferably, the spring is made from a spring material of continuously constant thickness and, resp., with continuously constant material thickness so that the inside diameters of the spring segments are of different size to the same degree as the outside diameters of the spring segments are of different size.

In an embodiment of the invention, the spring arranged in the combustion chamber may be completely arranged in the combustion chamber. Preferably, the spring is not completely arranged in the combustion chamber. The spring may be arranged in sections in an area of the gas generator which is associated with the igniter. The first, i.e. the igniter-side, end of the spring may be arranged e.g. outside the combustion chamber. In such example, the spring is inserted with the second end through a partition including a through-hose into the combustion chamber.

The spring can be moved or elongated in the direction of an end of the combustion chamber remote from the igniter by the gas flow produced when the gas generator is activated. The gas flow may enter into the area of the, especially unignited, pyrotechnic solid fuel bed zone. The spring defines in its interior, i.e. inside the spring segments and, resp., in the interior formed by the spring turns, a gas containing passage.

By the movement or elongation in the direction of flow the spring offers low resistance to the gas flow. In order to ensure rapid ignition of the gas the spring moves into the solid fuel bed and enables the pyrotechnic solid fuel bed to be ignited from a side other than via the evenly moving flame front.

The gas containing passage is preferably formed inside the compartment formed by the spring or between an inside of the combustion chamber wall and the outside of the spring.

The spring is configured to be elastic and consequently can elongate in the pyrotechnic solid fuel bed. The spring may be connected, for example, at a/the first end to a fixed part of the gas generator. The spring then is elongated by the flow so as to drive the gas containing passage into the pyrotechnic solid fuel bed.

The outside diameters of the at least three spring segments are reduced from a first igniter-side end toward a second end of the spring. In other words, the dimension of the outside diameters of the individual spring segments decreases from the igniter-side end toward the second end.

The first igniter-side end can also be referred to as first axial end. In the mounted state, the first igniter-side or axial end is associated with the igniter and, resp., the igniter subassembly of the gas generator. The first axial or igniter-side end is an open inflow end. The second end of the spring is the end of the spring which is arranged in the combustion chamber and upon activation can be moved, especially elongated, in the direction of the end of the combustion chamber remote from the igniter. Preferably, the second end of the spring is an open outflow end. The diameter of the second end of the spring is preferably smaller than the diameter of the first igniter-side end of the spring. Due to the configuration of an open inflow end and an open outflow end, igniter gas may be conveyed from the igniter into the combustion chamber. The igniter gas may flow out of the open outflow end, especially in the direction of the pyrotechnic solid fuel bed. Upon activation of the gas generator, the spring expands and elongates, resp., so that the distances between individual spring turns, in particular between individual spring turns of the third spring segment, are increased. The igniter gas may flow through the increased distances between the spring turns equally into the solid fuel bed, wherein preferably the major part of the gas flow of the igniter gas flows in the radial direction through the increased distances between the spring turns into the fuel bed.

A first spring segment is preferably configured at the igniter-side end of the spring and has the largest outside diameter. The first spring segment at the igniter-side end preferably compensates axial tolerances of the gas generator housing and/or of an igniter subassembly and, resp., of the gas generator. The tolerances in the gas generator and, resp., the gas generator housing may occur due to material tolerances or within the scope of the manufacturing process.

In other words, it is possible that the distance between an igniter base and, resp., an igniter casing and a partition of the combustion chamber is different in size. With the aid of the first spring segment of the spring preferably such different distances are compensated. The first spring segment at the igniter-side end of the spring is preferably arranged between an igniter base or an igniter casing and a partition of the combustion chamber. The partition includes a through-hole so that the spring can be inserted into the combustion chamber.

The first spring segment may be arranged to be clamped between the igniter base or between a stop side of the igniter casing and the partition. It is moreover possible that the first spring segment, especially the igniter-side end, is mounted on the igniter base and/or on a stop face of the igniter casing. For example, the first spring segment and/or the igniter-side end of the spring may be adhesively bonded and/or welded to the igniter base and/or the igniter casing.

The igniter may be a conventional igniter. I.e. additional booster charges, in particular additional booster chambers, can be dispensed with within the scope of the gas generator according to the invention. A sleeve including an igniting mixture which surrounds end, resp., is adjacent to the igniter is not necessary. Such booster charge or booster chamber can be dispensed with, as, on the basis of the configuration according to the invention, the spring forms a gas containing passage inside the gas generator and thus an ignition gas is enabled to flow out just as quickly as with the aid of a booster charge or a booster chamber. As a booster chamber or booster charge is dispensed with, material and cost can be saved.

In another embodiment of the invention, between the igniter-side end and the second end of the spring, especially adjacent to the first spring segment in the axial direction, a second spring segment is formed which has such inside diameter that the second spring segment at least in sections encloses the igniter and is movable in the axial direction. In other words, the inside diameter of the second spring segment is larger than the outside diameter of the igniter, especially larger than the outside diameter of the igniter cap.

Preferably, the second spring segment is connected to the first spring segment, wherein between the first spring segment and the second spring segment a transition segment may be formed. The transition segment may be, for example, merely a connecting spring turn. It is also possible that the transition segment is formed by plural spring turns, with the outside diameters of said spring turns being different. By the term adjacent to the first spring segment both directly adjacent and indirectly adjacent is to be understood. Adjacent to the first spring segment means that preferably no further spring segment including a plurality of spring turns having equal outside diameters is formed between the first spring segment and the second spring segment.

The outside diameter of the second spring segment is smaller than the outside diameter of the first spring segment. In the mounted state the second spring segment is located at least in sections in the combustion chamber of the gas generator. Preferably, the second spring segment starts with the through-hole of the partition and then protrudes into the combustion chamber of the gas generator. In other words, a first turn of the second spring segment is formed in the through-hole ands resp., in the area of the through-hole of the partition.

The second spring segment is longer in the axial direction than the igniter cap of the igniter so that the end face of the igniter cap can be destroyed when the gas generator is activated. The second spring segment of the spring encloses the igniter, especially the igniter cap, and is dimensioned such that intended breaking of the end face of the igniter cap is possible when the igniter is activated. The ignition gases and, resp., ignition particles of the igniter consequently may be distributed into the surrounding pyrotechnic solid fuel bed located in the axial direction.

The axial length of the second spring segment may be 1.5 to 3.0 times, especially 1.8 to 2.5 times, especially 1.9 to 2.3 times the axial length of the igniter cap of the igniter. With the aid of the given axial lengths the end face of the igniter cap may optimally break due to the free space formed between the end face and a further spring segment of the spring, when the gas generator is activated. Ideal breaking is understood to be so-called flower-shaped bursting or breaking. For example, the end face of the igniter subassembly may burst so that tab-shaped or segment-shaped partial areas of said end face are formed in the axial direction in such way that they have sufficient space within the axial extension of the second spring segment.

At the second end of the spring, especially adjacent to the second spring segment in the axial direction, a third spring segment may be formed. Said third spring segment may be movable into the unignited area of the solid fuel bed, when the gas generator is activated, and in its interior defines a gas containing passage reaching into the solid fuel bed. The second end of the spring is preferred to be the end of the spring facing away from the igniter.

Preferably, the third spring segment is in the form of a spring segment of the spring closing off in the axial direction. Between the second spring segment and the third spring segment a transition segment may be formed. The transition segment is a single turn of the spring, for example. In other words, the transition segment may be merely a connecting spring turn. It is also possible that the transition segment is formed by plural spring turns, with the outside diameters of said spring turns being different. The term adjacent to the second spring segment is understood to be both directly adjacent and indirectly adjacent. Adjacent to the second spring segment means that preferably no further spring segment including a plurality of spring turns having equal outside diameters is configured between the second spring segment and the third spring segment.

The transition segment between the second spring segment and the third spring segment may form a step surface. A step surface is preferably configured to be spaced apart from the igniter, especially from the end face of the igniter cap. The space is formed due to the axial length of the second spring segment.

The third spring segment preferably is the segment of the spring having the smallest outside diameter. Also, the inside diameter of the third spring segment may be the smallest inside diameter of the spring. The third spring segment is preferably designed to be so small that a large part of the combustion chamber is or can be filled with a pyrotechnic solid fuel bed. However, the third spring segment of the spring also has to be designed to be so large that due to the spring an efficient ignition passage can be formed and gas flow into the pyrotechnic solid fuel bed can be produced when the gas generator is activated.

In the idle state of the gas generator or, resp., in the non-activated state of the gas generator, inside the spring, especially inside the first and/or second and/or third spring segment no solid fuel charge is provided. In other words, no fuel member is provided inside the volume formed and, resp., enclosed by the spring.

In one embodiment of the invention, at least one advance ignition pellet may be provided in the solid fuel bed. The pyrotechnic solid fuel bed thus may comprise at least one advance ignition pellet. In the event of so-called "bonfire", an early activation of the gas generator may take place. The event of "bonfire" relates to triggering of the gas generator by external increase in temperature only. Such external increase in temperature may be given in the case of a burning vehicle.

At least one advance ignition pellet may be arranged in the area of the igniter cap, especially when it contacts a portion of the external gas generator housing. In the case of contact with the external gas generator housing, a preferably proper heat transfer takes place between the external temperatures and the interior of the gas generator. If the advance ignition pellet is arranged to be in the vicinity of or adjacent to the igniter cap, early activation of the gas generator can be effectuated.

Summing up, the gas generator according to the invention is a gas generator of simple constructional design, wherein axial tolerances in the area of the gas generator housing can be compensated by simply constructional auxiliaries and, at the same time, rapid ignition of the gas generator as well as short deployment time of an airbag are facilitated.

Within the scope of another aspect, the invention is based on the idea to state a spring for arranging in a gas generator. The spring according to the invention includes a plurality of spring segments, especially at least three spring segments, having outside diameters of different size and/or inside diameters of different size, wherein each spring segment comprises a plurality of spring turns.

The outside diameters of the spring segments are reduced from a first, especially igniter-side, end toward a second end of the spring. Inside each spring segment constant outside diameters and/or constant inside diameters are provided. As regards the spring according to the invention, the structure thereof as well as the advantages resulting therefrom, reference is made to the foregoing explanations. The statements regarding the configuration of the spring listed in connection with the afore-mentioned gas generator according to the invention are also applicable to the spring according to the invention for arranging in a gas generator according to the foregoing remarks and vice versa.

In total, for the spring according to the invention advantages similar to those already illustrated in connection with the gas generator according to the invention as described in the beginning are resulting.

With respect to an airbag module, the object is achieved by the features of claim 11. Such airbag module according to the invention may comprise a gas generator according to the invention or a spring according to the invention.

Apart from a gas generator according to the invention or a spring according to the invention, the airbag module comprises an airbag which can be inflated in the case of operation with the aid of a gas generator, especially with the aid of the gas generator according to the invention.

With respect to a vehicle occupant protection system, the object is achieved by the features of claim 12. Consequently, the vehicle occupant protection system includes a gas generator according to the invention or a spring according to the invention or an airbag module according to the invention. Advantages similar to those already illustrated in connection with the gas generator according to the invention and/or with the spring according to the invention are resulting.

BRIEF DESCRIPTION OF THE DRAWINGS

Hereinafter, the invention shall be illustrated in detail by way of embodiments with reference to the enclosed schematic drawings, wherein.

DESCRIPTION

Figure 1:
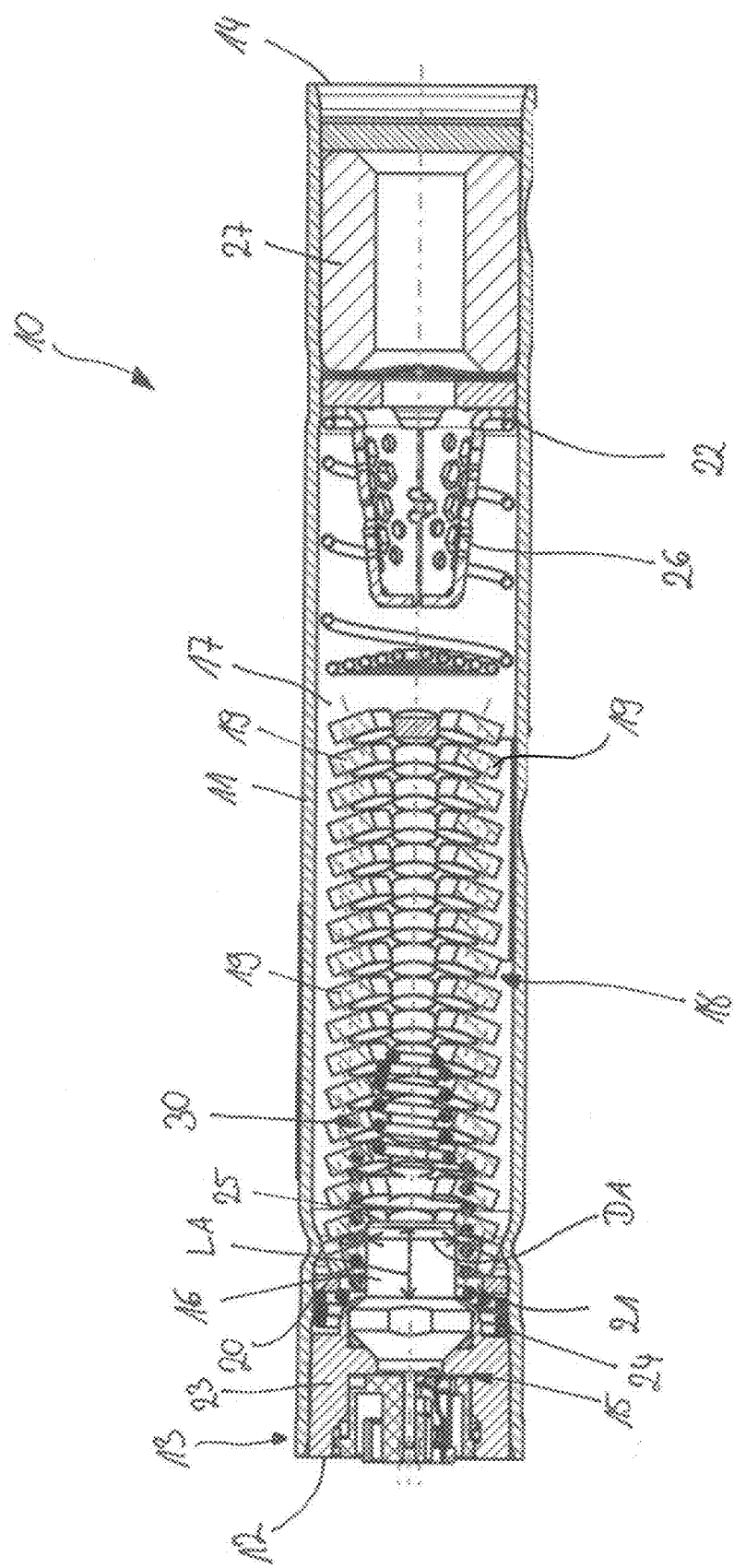
FIG. 1: shows a sectional view of a gas generator according to the invention comprising a spring according to the invention.

In the following like reference numerals will be used for like and equally acting parts.

FIG. 1 shows a gas generator 10 comprising an elongate cylindrical gas generator housing 11. An igniter subassembly 13 is provided at the first axial end 12 of the gas generator housing 11. At the second axial end 14 of the gas generator housing 11 the gas generated in the gas generator 10 flows out of the gas generator 10 and, for example, into an airbag (not shown). The gas generator housing 11 forms the outer housing of the gas generator 10.

The igniter subassembly 13 comprises an igniter 15 including an igniter cap 16. In the equally shown combustion chamber 17 a pyrotechnic solid fuel bed 18 is provided. The individual pellet-shaped fuel members 19 are shown. The pyrotechnic fuel bed 18 consequently consists of a filling of individual fuel members 19. The igniter subassembly 13 is separated in sections from the adjacent combustion chamber 17 via a disk-shaped partition 20. In an embodiment (not shown) the partition 20 may also be dispensed with. The combustion chamber 17 has a total length which is at least three times as large as the largest extension in cross-section.

FIG. 1 illustrates a non-activated state of the gas generator 10. In the combustion chamber 17 at least in sections a spring 30 is arranged which can be elongated in the direction of the end 22 of the combustion chamber 17 remote from the igniter 15 by the gas flow produced when the gas generator 10 is activated.

Figure 2:
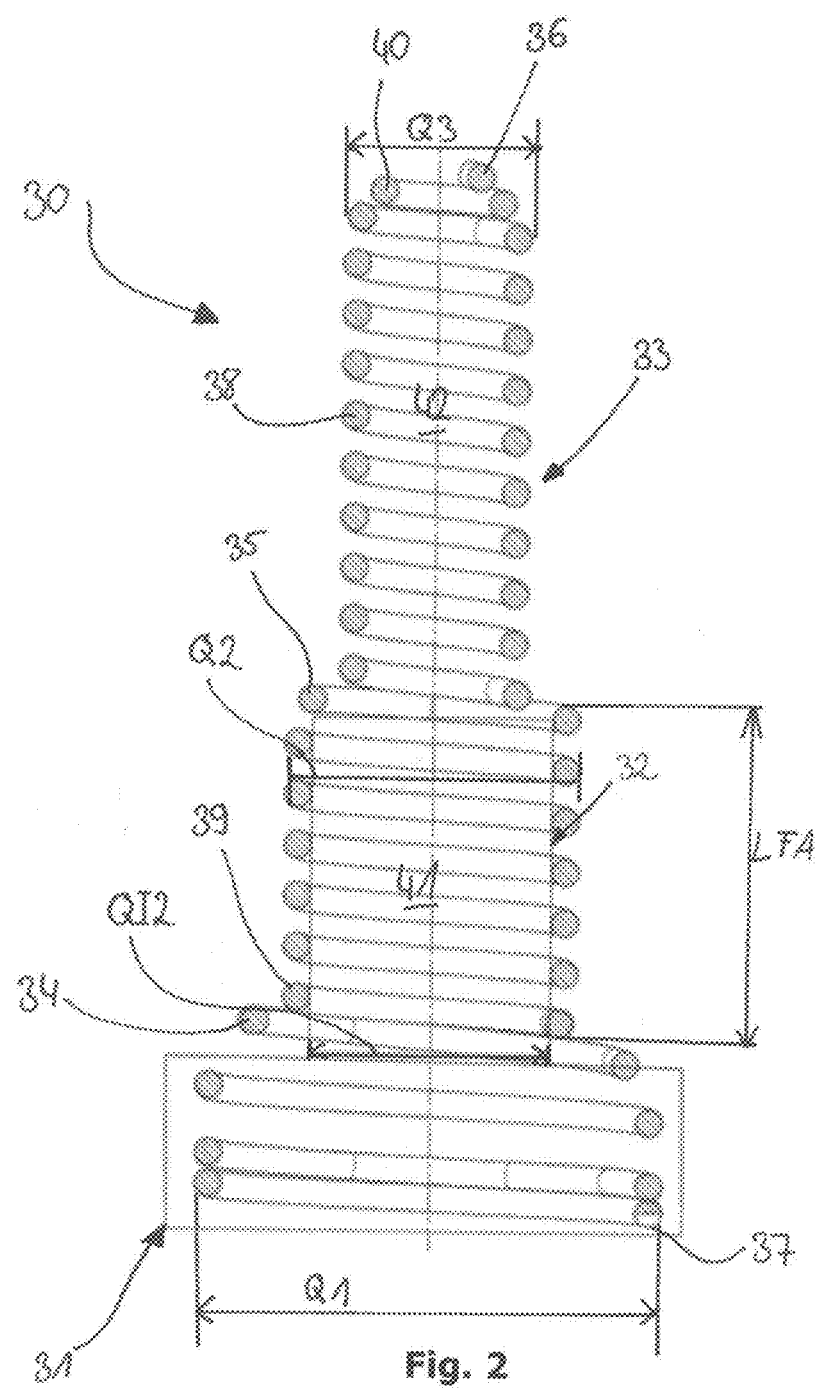
FIG. 2: shows a sectional view of a spring according to the invention.

The spring 30 (cf. FIG. 2 in this context) comprises three spring segments 31, 32, 33 having outside diameters Q1, Q2 and Q3 of different size. The outside diameters Q1, Q2 and Q3 of the spring segments 31, 32, 33 decrease from the igniter-side end 37 toward the second end 36 of the spring 30. The outside diameter Q1 of the first spring segment 31 is larger than the outside diameter Q2 of the second spring segment 32. The outside diameter Q2 of the second spring segment 32 is larger than the outside diameter Q3 of the third spring segment 33.

The first spring segment 31 at the igniter-side end 37 of the spring 30 has the largest outside diameter Q1. In the mounted state (cf. FIG. 1) said spring segment 31 compensates axial tolerances of the gas generator housing 11. The first spring segment 31 at the igniter-side end 37 of the spring 30 is arranged between the igniter base 23 and the partition 20. In particular the distance between the stop side 24 of the igniter base 23 and the partition 20 may vary for reasons of manufacture. Said variable distances may be compensated due to the first spring segment 31.

Each of the first spring segment 31, the second spring segment 32 and the third spring segment 33 includes a plurality of spring turns. In each of the respective spring segments 31, 32, 33 a uniform outside diameter Q1, Q2, Q3 is formed. Since the spring 30 is made from a spring wire 38 of continuously constant thickness, the state of the respective inside diameter of the first spring segment 31, of the second spring segment 32 and of the third spring segment 33 behaves corresponding to the respective outside diameters Q1, Q2 and Q3.

Between the igniter-side end 37 and the second end 36 of the spring 30, the second spring segment 32 is formed which has such inside diameter QI2 that the second spring segment 32 encloses the igniter 15, especially the igniter cap 16, in sections and is movable in the axial direction, i.e. in the direction of the first axial end 12 of the gas generator housing 11 as well as in the direction of the second axial end 14 of the gas generator housing 11. The inside diameter QI2 of the second spring segment 32 thus is larger than the outside diameter DA of the igniter cap 16.

Moreover, the second spring segment 32 is longer in the axial direction than the igniter cap 16 of the igniter 15 so that upon activation of the gas generator 10 the end face 25 of the igniter cap 16 can be destroyed. Accordingly, when the gas generator 10 is activated, the end face 25 may burst and is not compressed or jammed by spring turns of the second spring segment 32. The end face 25 may preferably burst in flower shape. The ignition gas may flow from the igniter 15 in the direction of the end 22 of the combustion chamber 17.

The axial length LFA of the second spring segment 32 especially is 1.9 to 2.3 times the axial length LA of the igniter cap 16 of the igniter 15. The second spring segment 32 is formed to be adjacent to the second spring segment 31 in the axial direction. Between the second spring segment 32 and the first spring segment 31 merely a transition segment 34 formed of one turn is configured.

The first turn 39 of the second spring segment 32 is formed in the through-hole 21 of the partition 20 in the mounted state. With the aid of the through-hole 21, both the spring 30 and the igniter cap 16 in sections can be inserted into the combustion chamber 17.

At the second end 36 of the spring 30 the third spring segment 33 is formed. When the gas generator 10 is activated, especially said third spring segment 33 is movable into the unignited area of the pyrotechnic solid fuel bed 18. The interior 42 of the third spring segment 33, i.e. the inner volume of the spring formed by the third spring segment 33, defines a gas containing passage reaching into the pyrotechnic solid fuel bed 18. In this way, the ignition gas generated by the igniter 15 can evenly and rapidly enter into the pyrotechnic solid fuel bed 18. The end 36 of the spring 30 is formed by a final spring turn 40. Said final spring turn 40 may have a smaller outside diameter than the outside diameter Q3 of the third spring segment 33.

The third spring segment 33 is configured to be adjacent to the second spring segment 32 in the axial direction. Between the second spring segment 32 and the third spring segment 33 merely a transition segment 35 formed of one spring turn is configured.

Between the transition segment 35 and the end face 25 of the igniter cap 16 a sufficient space is formed so that the end face 25 can be destroyed, as already mentioned, when the gas generator 10 is activated.

Upon activation of the gas generator 10, especially the third spring segment 33 moves to the right inside the pyrotechnic solid fuel bed 18. The third spring segment 33 so-to-speak migrates along with the pressure wave and paves its way through the pyrotechnic solid feel bed 18. The directed guiding of the expanding and, resp., moved spring 30 is effectuated, inter alia, due to the partition 20 and the through-hole 21 formed therein. In the interior 41 of the spring 30, i.e. in the inner volume formed by the spring 30 no fuel members 19 are provided.

The gas formed leaves the combustion chamber 17 through the combustion chamber screen 26. It is possible for the generated gas to flow through a filter package 27 after leaving the combustion chamber screen 26.

LIST OF REFERENCE NUMERALS 10 gas generator
11 gas generator housing
12 first axial end
13 igniter subassembly
14 second axial end
15 igniter
16 igniter cap
17 combustion chamber
18 pyrotechnic solid fuel bed
19 fuel member
20 partition
21 through-hole
22 end of combustion chamber
23 igniter base
24 stop side
25 end face of igniter cap
26 combustion chamber screen
27 filter package
30 spring
31 first spring segment
32 second spring segment
33 third spring segment
34 transition segment
35 transition segment
36 second end
37 igniter-side end
38 spring wire
39 first spring turn
40 final spring turn
41 spring interior
42 spring interior of third spring segment
Q1 outside diameter of first spring segment
Q2 outside diameter of second spring segment
Q3 outside diameter of third spring segment
QI2 inside diameter of second spring segment
DA outside diameter of igniter cap LA length of igniter cap
LFA length of second spring segment

The invention claimed is:

1. A gas generator (10) for a vehicle occupant protection system, comprising:
   at least an igniter (15) and a combustion chamber (17) containing a pyrotechnic solid fuel bed (18); and
   a spring (30) arranged in the combustion chamber (17), the spring being elongatable in a direction of an end (22) of the combustion chamber (17) remote from the igniter (15), the spring (30) having a plurality of spring segments (31, 32, 33) having outside diameters (Q1, Q2, Q3) of different size, each spring segment (31, 32, 33) having a plurality of spring turns, each spring turn of an associated spring segment (31, 32, 33) having the same outside diameter (Q1, Q2, Q3) so that the plurality spring turns of an associated spring segment defines a cylindrically-shaped spring segment.

2. The gas generator (10) according to claim 1, wherein the spring (30) includes three or four spring segments (31, 32, 33) having outside diameters (Q1, Q2, Q3) of different size, wherein each spring segment (31, 32, 33) has a plurality of spring turns.

3. The gas generator (10) according to claim 1, wherein the outside diameters (Q1, Q2, Q3) of the spring segments (31, 32, 33) decrease from a first igniter-side end (37) toward a second end (36) of the spring, and/or in that a first spring segment (31) has the largest outside diameter (Q1) at the igniter-side end (37) of the spring.

4. The gas generator (10) according to claim 1, wherein a first spring segment (31) compensates axial tolerances of a gas generator housing (11) of the gas generator (10) and/or or of an igniter subassembly (13) at the igniter-side end (37) of the spring.

5. The gas generator (10) according to claim 1, wherein a first spring segment (31) is arranged at an igniter-side end (37) of the spring between an igniter base or igniter casing and a partition (20) of the combustion chamber (17).

6. The gas generator (10) according to claim 3, wherein between the igniter-side end (37) and the second end (36) of the spring, a second spring segment (32) is configured which has such inside diameter (012) that the second spring segment (32) at least in sections encloses the igniter (15), and is movable in the axial direction.

7. The gas generator (10) according to claim 6, wherein the second spring segment (32) is longer in the axial direction than an igniter cap (16) of the igniter (15) so that upon activation of the gas generator (10) an end face (25) of the igniter cap (16) can be destroyed.

8. The gas generator (10) according to claim 6, wherein an axial length (LFA) of the second spring segment is 1.5 to 3.0 times an axial length of an igniter cap (16) of the igniter (15).

9. The gas generator (10) according to claim 6, wherein at the second end (36) of the spring, adjacent to the second spring segment (32) in the axial direction, a third spring segment (33) is configured which, when the gas generator (10) is activated, is movable into an unignited area of the solid fuel bed (18) and in its interior (42) defines a gas containing passage reaching into the solid fuel bed (18).

10. The gas generator (10) according to claim 1, wherein the solid fuel bed (18) comprises at least one advance ignition pellet, wherein the advance ignition pellet is arranged in the area of an igniter cap (16) contacting a segment of an external gas generator housing (11) of the gas generator (10).

11. A spring (30) for arranging in the gas generator (10) according to claim 1, wherein a plurality of spring segments (31, 32, 33) having outside diameters (Q1, Q2, Q3) of different size, wherein each spring segment (31, 32, 33) has a plurality of spring turns.

12. The spring (30) according to claim 11, wherein the outside diameters (Q1, Q2, Q3) of the spring segments (31, 32, 33) decrease from a first end (37) toward a second end (36) of the spring, wherein the spring (30) forms an ignition passage spring of the gas generator (10).

13. An airbag module comprising a gas generator (10) according to claim 1.

14. An airbag module comprising or comprising a spring (30) according to claim 11.

15. A vehicle occupant protection system comprising a gas generator (10) according to claim 1.

16. A vehicle occupant protection system comprising a spring (30) according to claim 11.

17. A vehicle occupant protection system comprising an airbag module according to claim 13.

18. A vehicle occupant protection system comprising an airbag module according to claim 14.

* * * * *